(12) United States Patent
Harada et al.

(10) Patent No.: US 7,438,420 B2
(45) Date of Patent: Oct. 21, 2008

(54) DISPLAY APPARATUS

(75) Inventors: Shigeki Harada, Tokyo (JP); Taichiro Tamida, Tokyo (JP); Akihiko Iwata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/669,471

(22) Filed: Jan. 31, 2007

(65) Prior Publication Data

US 2007/0200955 A1  Aug. 30, 2007

(30) Foreign Application Priority Data

Feb. 10, 2006  (JP)  ............... 2006-033826

(51) Int. Cl.
  G03B 21/26  (2006.01)
  G03B 21/20  (2006.01)
  G03B 21/18  (2006.01)
  G03B 21/16  (2006.01)
  G02F 1/133  (2006.01)

(52) U.S. Cl. ............... 353/30; 353/52; 353/84; 353/85; 315/117; 349/72

(58) Field of Classification Search .......... 353/52, 353/57, 58, 85, 119, 121, 30, 84; 396/97, 396/225, 231, 571, 572, 575; 62/3.7; 315/112, 315/117, 118; 349/5–8, 72

See application file for complete search history.

(56) References Cited

U.S. PATENT DOCUMENTS

| 5,717,422 A | 2/1998 | Fergason ............. 345/102 |
| RE36,060 E * | 1/1999 | Miyashita ............ 348/748 |
| 7,052,143 B2 * | 5/2006 | Russell et al. ......... 353/58 |

FOREIGN PATENT DOCUMENTS

| JP | 62-19835 | 1/1987 |
| JP | 5-66501 | 3/1993 |
| JP | 6-160811 | 6/1994 |

* cited by examiner

*Primary Examiner*—Melissa Jan Koval
(74) *Attorney, Agent, or Firm*—Oblon, Spivak, McClelland, Maier & Neustadt, P.C.

(57) ABSTRACT

A display apparatus having a control unit which controls the light source temperature so that the temperature remains within a predetermined temperature range, a light modulation device for displaying images by receiving light emitted from the light source, and modulating the light according to the image data, and a light source controlling unit which adjusts the amount of light that enters the light modulation device, by controlling electrical power fed to the light source, according to the brightness data. Even if a contrast ratio is improved by changing the amount of light of an HID lamp, a passive optical modulation type display apparatus can be provided without reducing the lifetime of the light source lamp.

14 Claims, 12 Drawing Sheets inclination angle of color wheel's rotation axis
with respect to optical axis (°)

DISPLAY APPARATUS

BACKGROUND OF THE INVENTION

1. Field of the Invention

The present invention relates to passive optical modulation type display apparatuses in which the amount of light emitted from the light source can be changed.

2. Description of the Related Art

A conventional passive optical modulation type display apparatus employs a light modulation device, to modulate in response to image data inputted from outside, light emitted from the light source and thereby display images. By adjusting light modulation device optical transmittance or its reflectance, the display apparatus of the passive optical modulation type displays gray scale of the image data. The fact that the light modulation device in this display apparatus has inferior light modulation linearity and stray light enters the device, will worsen a contrast ratio of maximum to minimum brightness, so that the gray scale that the image data intrinsically retains are not allowed to be displayed.

For this reason, the contrast ratio is improved by adjusting the intensity of light—the amount of light—that enters the light modulation device. For instance, there is a method for controlling the amount of light from the light source, in response to features of inputted image data. The peak brightness that represents the features of the image data is detected, so that the contrast ratio is enhanced by intensifying the light source when the detected peak brightness is high, or by lowering it when low (refer to, e.g., Japanese Unexamined Patent Publication 62-19835, page 4, FIG. 1, and Japanese Unexamined Patent Publication 6-160811, page 2, FIG. 1). Alternatively, the average brightness that represents the features of the image data is detected, so that the contrast ratio is enhanced by intensifying the light source when the average brightness is high, or by lowering it when low (refer to, e.g., Japanese Unexamined Patent Publication 5-66501, page 3, FIG. 1, and U.S. Pat. No. 5,717,422, page 15, FIG. 8). This method is employed in direct-view liquid crystal displays using, as backlight, cold-cathode tube fluorescent lamps or light-emitting diodes.

The conventional passive optical modulation type display apparatus adopts as the light source a high intensity discharge (HID) lamp such as a metal halide lamp or an ultrahigh pressure mercury lamp. The HID lamp uses tungsten as an electrode material. When the lamp is lit, a halogen cycle is utilized in order to reduce tungsten wear due to arc-discharging heat. Proper operation of the halogen cycle requires maintaining bulb inner wall temperature within a proper temperature range. However, when the amount of light emitted from the source is adjusted in accordance with the image data features, adjusting the amount of light based on electric power fed to the lamp will greatly change the bulb inner wall temperature, in response to the electric power variations, as well. As a result, a problem has been that when the wall temperature falls outside the proper temperature range, the halogen cycle will not work properly, thus resulting in a lamp lifetime being reduced.

Furthermore, a spectral distribution characteristic of radiant light from the HID lamp is greatly dependent on the pressure of in-bulb substances. The pressure of the in-bulb substances is in turn dependent on the in-bulb temperature. Consequently, another problem has been that when the wall temperature lies outside the temperature range, the spectral distribution of the radiant light will vary, thus resulting in color characteristics, such as lamp color temperature and chromaticity, being changed. Furthermore, discharging impedance in the HID lamp is largely dependent on the in-bulb pressure and temperature. Therefore, another problem has been that when the wall temperature goes out of the temperature range, the discharging impedance will vary, which causes a load on the electrode to change, resulting in the lamp lifetime being reduced. Furthermore, when the lamp works properly so that the wall temperature remains within the temperature range, the amount of light emitted from the light source cannot be greatly changed. Therefore, another problem has been that the contrast ratio cannot be greatly improved.

The present invention is directed to overcome the above-discussed problems. It is an object of the present invention to provide a passive optical modulation type display apparatus that ensures a prolonged lamp lifetime and the proper lamp operation even when higher contrast is realized in response to features of inputted image data, by adjusting the amount of light from the light source. Another object of the present invention is to provide a passive optical modulation type display apparatus enhancing the contrast ratio by adjusting the amount of light that enters the light modulation device.

SUMMARY OF THE INVENTION

The present invention is directed to a display apparatus that comprise an image data input means that receives image data, a brightness extraction means that outputs the brightness data digitized in response to the image data, a light source, a light source temperature controlling means that controls in response to the brightness data, light source temperature so as to remain within a predetermined temperature range. The display apparatus further comprises a light modulation device that displays images by receiving light emitted from the light source and then modulating the light in response to the image data, and a light source ignition means that adjusts the amount of light that enters the light modulation means, by controlling in response to the brightness data, electric power fed to the light source.

The present invention is also directed to the display apparatus that comprises an image data input means that receives image data, a brightness extraction means that outputs the brightness data digitized based on the image data, the light source, a light source temperature controlling means that controls in response to the brightness data, light source temperature so that the temperature remains within the predetermined range. The display apparatus further comprises a light modulation device that displays images by receiving light emitted from the light source and by modulating the light in response to the image data, and a light source ignition means that adjusts the amount of light entering the light modulation means, by controlling in response to the brightness data, the electric power fed to the light source. A passive optical modulation type display apparatus that is designed to enhance its contrast ratio and to prolong its lamp lifetime can, therefore, be provided.

DETAILED DESCRIPTION OF THE PREFERRED EMBODIMENTS

Figure 1:
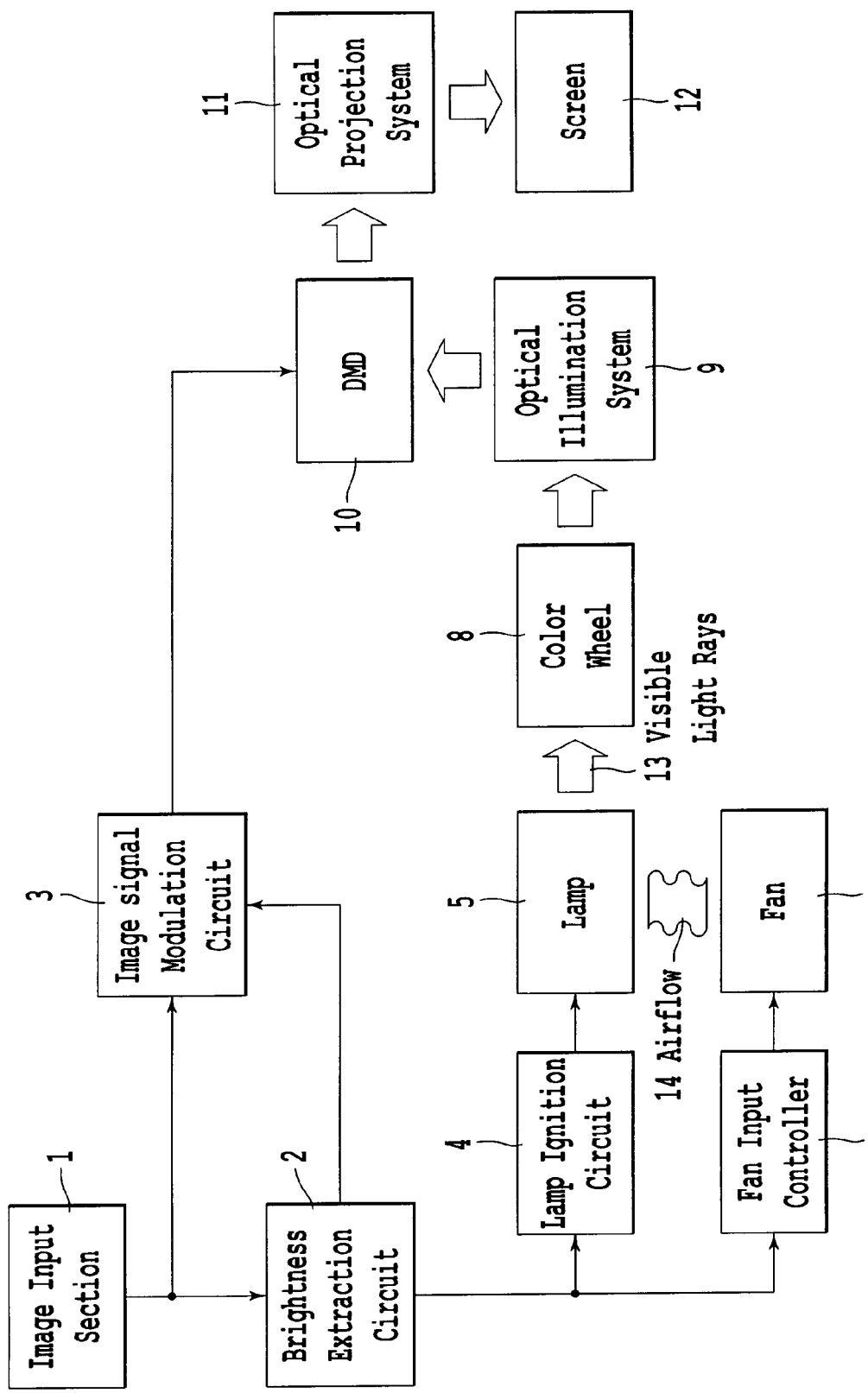
FIG. 1 is a system block diagram of a passive optical modulation type display apparatus for explaining a first embodiment of the present invention.

FIG. 1 is a system block diagram of a passive optical modulation type display apparatus in a first embodiment for implementing the present invention. In the embodiment, the passive optical modulation type display apparatus is a projection display that uses a DMD as a light modulation device. Referring to FIG. 1, the display apparatus includes as main unit a signal processing unit, a light source unit, a light source cooling unit, and an optical structure. Image data is inputted from an image input section 1—an image data input means.

The signal processor is constituted of a brightness extraction circuit 2 and an image signal modulation circuit 3. The brightness extraction circuit 2 digitizes according to the inputted image data (image signals) brightness features, to output them as brightness data. The brightness data digitized at the extraction circuit 2 may include average brightness, or peak brightness. Also, the brightness data may be digitized in accordance with brightness features acquired using another algorithm. A contrast ratio is represented by a ratio of maximum to minimum of brightness of a display screen. The contrast ratio can be improved by making bright images brighter and dim images dimmer. By brightness data digitized at the extraction circuit 2, the image signal modulation circuit 3 modulates original image signals to generate a drive voltage, outputting it into a DMD 10 as a light modulation device.

The light source unit is constituted of the lamp ignition circuit 4 (the light source ignition means), and the lamp 5 (the light source). The lamp ignition circuit 4 inputs from the extraction circuit 2 the digitized brightness data, controlling power fed to the lamp 5 according to the brightness data. The lamp 5, which is an ultrahigh pressure mercury lamp as one type of HID lamps, emits visible light rays 13.

The light source cooling unit is constituted of a fan input controller 6 and a fan 7. Airflow 14 from the fan 7 can cool the lamp 5, to cause temperature of the lamp 5 to stabilize. The fan input controller 6 controls DC voltage supplied to the fan 7 according to the brightness data digitized at the extraction circuit 2, to cause a rotation speed of the fan 7 to vary. The controller 6 may incorporate a series regulator or a switching regulator.

The optical structure is constituted of a color wheel 8, an optical illumination system 9, the DMD 10, an optical projection system 11, and a screen 12. Light rays emitted from the lamp 5 are temporally divided by the color wheel 8 into those having red, green and blue wavelengths, in that order. Each divided light ray is formed in accordance with the shape and size of the DMD 10 by the optical illumination system 9, being projected onto the DMD 10. The DMD 10 is constituted of a plurality of micro-mirror devices that is two-dimensionally configured on a semiconductor substrate. The DMD 10 modulates the light rays by changing inclination of each micro-mirror, in response to input signals in accordance with image data supplied from the image signal modulation circuit 3. The light that has been optically modulated by the DMD 10 is projected onto the screen 12 by the optical projection system 11, so as to be displayed as viewable images to a viewer. Stated another way, the DMD 10 receives light emitted from the lamp 5 as the light source and displays images by modulating the light in response to image data.

Based upon the brightness data digitized at the brightness extraction circuit 2, the amount of light entering the DMD 10 can be determined. The larger power fed to the lamp 5 becomes, the larger the amount of light emitted from the lamp 5, so that the brightness can be increased. Therefore, in response to the brightness data, changing power supplied to the lamp 5 can make a desired amount of light enter the DMD 10. That is, the lamp ignition circuit 4 is a light source ignition means that adjusts the amount of light entering the DMD 10, by controlling in response to the brightness data, power supplied to the lamp 5.

Figure 2:
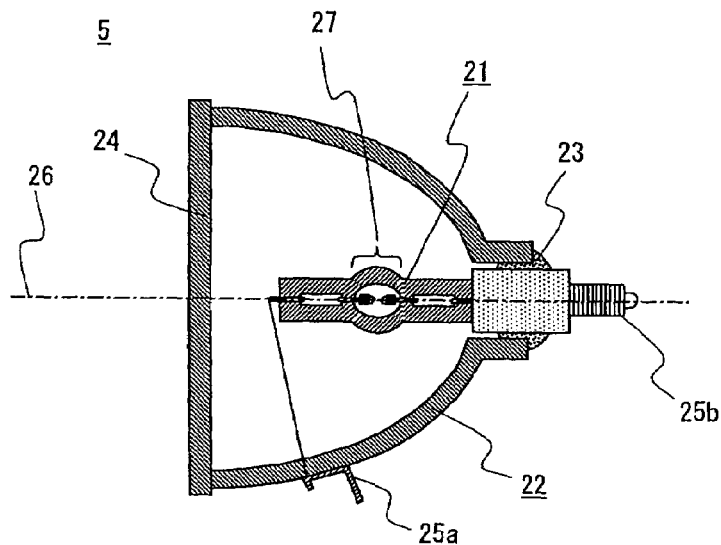
FIG. 2 is a sectional side elevation of an ultrahigh pressure mercury lamp in the first embodiment of the present invention.

FIG. 2 is a sectional side elevation of the lamp 5 (ultrahigh pressure mercury lamp), not shown, in the first embodiment of the present invention. The lamp 5 is constituted of a lamp bulb 21 and a reflector 22. The light bulb comprises an electrode made of tungsten, and a discharge space where mercury and metal halide are encapsulated. A bulb top 27 of the bulb 21 is referred to as an outer wall of the spherical portion in the center of the bulb 21. A sealing material 23 seals the bulb 21 and the reflector 22. The electrodes 25a and 25b are used to apply voltage to the bulb 21. Visible light rays emitted by arc-discharging from the bulb 21 are reflected from the reflector 22, focused upon, through a front glass 24, one point along the optical axis of the lamp 5, and then turned into imaging rays after passing through the optical structure.

Figure 3:
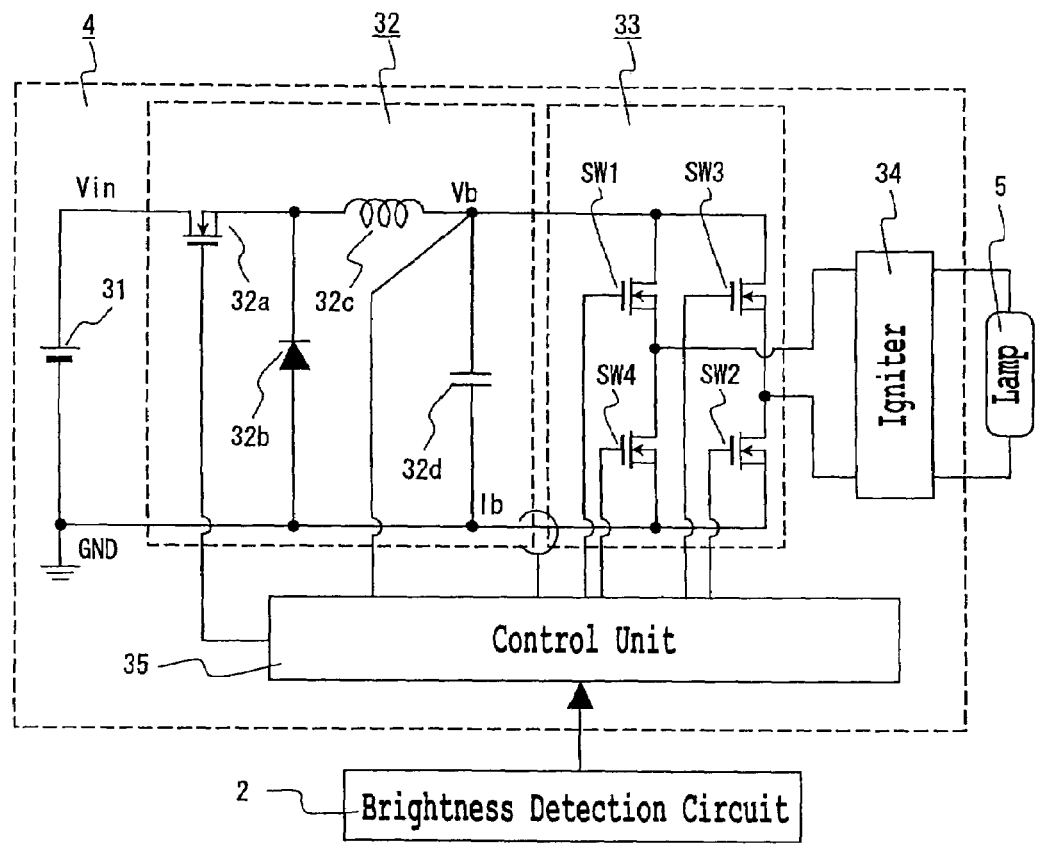
FIG. 3 is a schematic diagram of a lamp ignition circuit in the first embodiment of the present invention.

FIG. 3 is a schematic diagram of a lamp ignition circuit in the first embodiment of the present invention. The lamp ignition circuit 4 is constituted of a DC power supply 31, a DC-DC converter 32, an inverter 33, an igniter 34, and a control unit 35. The DC-DC converter 32 is a chopper step-down converter, being constituted of a switch 32a, a diode 32b, a coil 32c, and a capacitor 32d. The converter 32 converts into a predetermined DC voltage Vb a DC voltage Vin applied from the DC power supply 31. The voltage Vin is a DC voltage obtained by full-wave-rectifying commercial AC power into DC power and then boosting it.

The inverter 33 is a full-bridge inverter that is constituted of switches SW1 through SW4. The inverter 33 inverts into an AC rectangular waveform the DC voltage Vb that has been converted by the DC-DC converter, to apply the AC rectangular-waveform across the electrodes 25a and 25b. In order to initially start up the lamp 5, the igniter 34 is connected between the inverter 33 and the lamp 5. The igniter 34 applies across the electrodes 25a and 25b a voltage by which the lamp 5 can make a dielectrical breakdown at the initial start up of the lamp 5. The control unit 35 senses the DC voltage Vb and the DC current Tb, and thereby calculates power consumed by the lamp 5. The control unit 35 determines, according to the brightness data digitized at the extraction circuit 2, target power to be fed to the lamp 5, to control a switching frequency, and a duty cycle, of the switch 32a in the converter 32 50 that that there will be no difference between the sensed power and the target power.

In such a display apparatus, when power (lamp power) fed to the lamp 5 is changed according to the brightness data, the lamp 5 temperature needs to remain within a proper temperature range so that that the halogen cycle may work properly. Therefore, there is a need for the temperature on the inner wall of the bulb 21 to be set in the proper temperature range. However, since the bulb inner wall temperature cannot easily be measured, a lamp manufacturer recommends as an index a temperature of the bulb top 27 (a bulb top temperature) instead. For example, in the ultrahigh pressure mercury lamp used for the measurement, a predetermined range in which the bulb top temperature is maintained properly is 930 through 970 degrees C. at a rated power of 150 watts.

Figure 4:
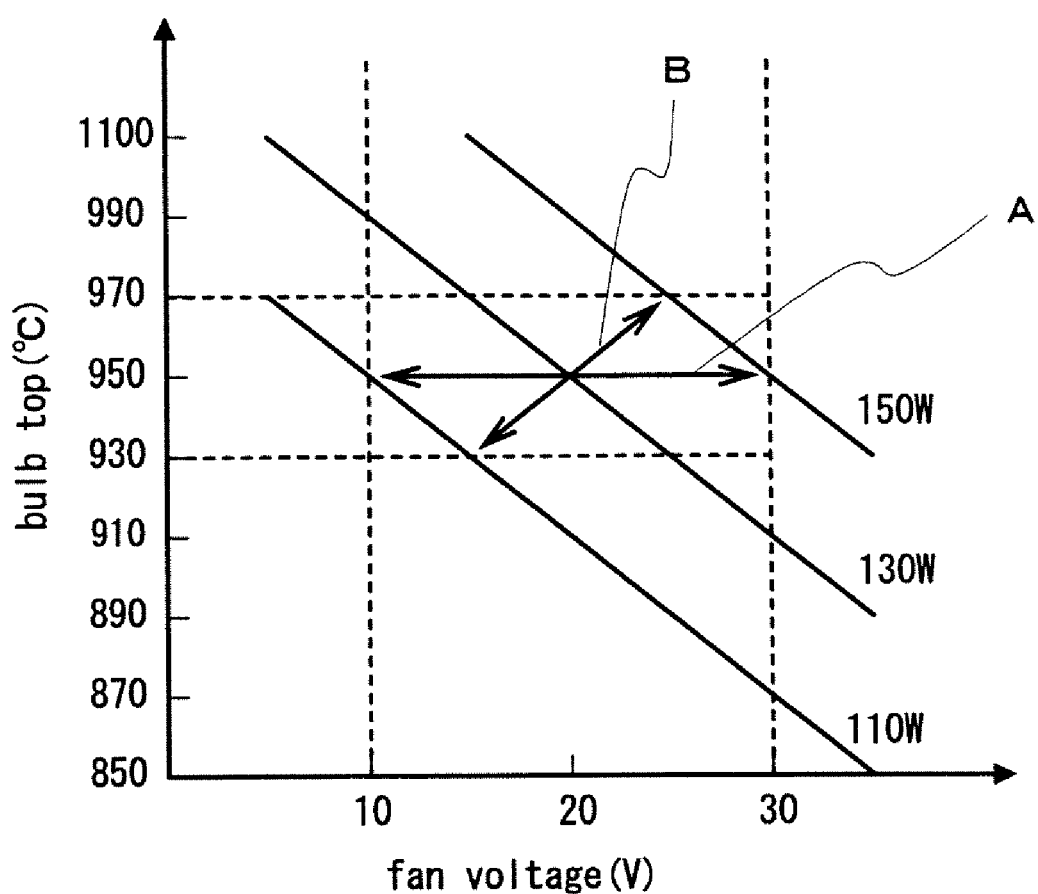
FIG. 4 is a graph illustrating a relationship between fan voltage and bulb top temperature, corresponding to lamp power, in the first embodiment of the present invention.

In order to stabilize the bulb top temperature by changing lamp power, there is a method of cooling the lamp 5 with the fan 7. Cooling performance of the lamp 5 depends on DC voltage (fan voltage) to the fan 7. FIG. 4 is a graph illustrating a relationship between the fan voltage and the bulb temperature, corresponding to the lamp power. Referring to FIG. 4, the lamp ignition circuit 4 controls the lamp power from 150 watts down to 110 watts. FIG. 4 indicates that even if the lamp power changes, properly selecting the fan voltage allows the bulb temperature to remain within the predetermined temperature range.

For instance, changing, as "A" shown in FIG. 4, the fan voltage in response to variations of the lamp power can maintain the bulb temperature at 950 degrees C. For instance, changing, as "B" shown in FIG. 4, the fan voltage in response to the lamp power variations can maintain the temperature range between 930 and 970 degrees C. That is, the controller 6 and the fan 7 are light source temperature adjustment means that adjusts according to the brightness data the temperature, i.e., the temperature of the light source, so that that the temperature falls within the predetermined range. In this way, with the temperature remaining in the proper temperature range, the light source temperature adjustment means can largely change the lamp power; therefore, the contrast ratio can be raised without reducing the lifetime of the lamp 5.

With the preceedingly described configuration, in the passive optical modulation type display apparatus using the HID lamp, even when the amount of light entering the DMD 10 is changed by controlling the power supplied to the lamp 5, the bulb temperature, i.e., the temperature of the lamp 5 can remain within the temperature range in which the halogen cycle can work properly, which thereby provides a passive optical modulation type display apparatus having a higher contrast ratio and a prolonged lamp lifetime.

Figure 5:
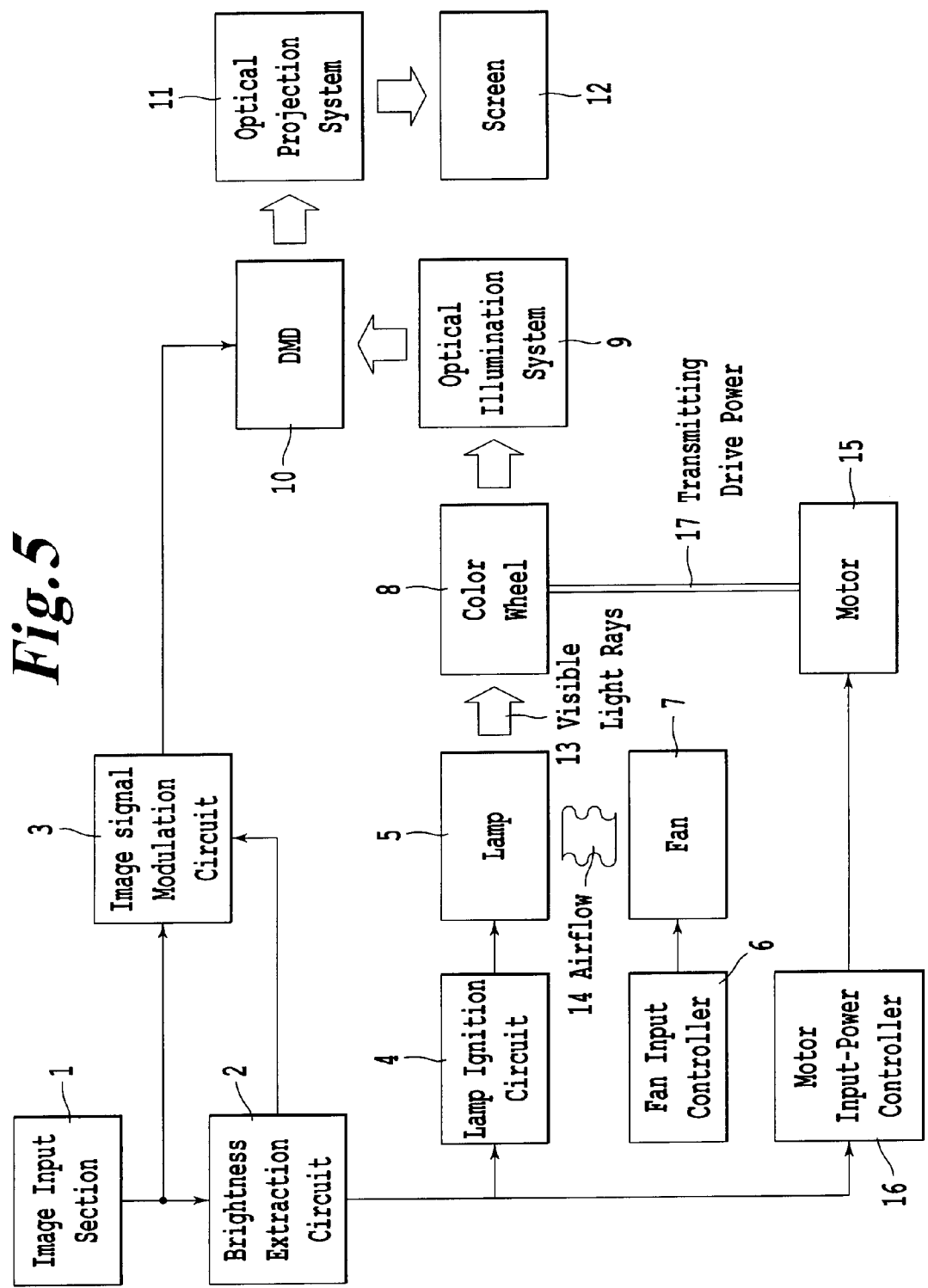
FIG. 5 is a block diagram of a passive optical modulation type display apparatus for explaining a second embodiment of the present invention.

FIG. 5 is a block diagram of a passive optical modulation type display apparatus in a second embodiment for implementing the present invention. Referring to FIG. 5, the second embodiment differs from the first embodiment in that the light source cooling unit is provided with a motor 15 and a motor input-power controller 16. In FIG. 5, parts to which the same symbols as those in FIG. 1 are applied indicate the same or equivalent ones, which hold for the overall specification. Moreover, descriptions of the constituent elements appeared throughout the specification are completely exemplary, and the elements are not limited to those descriptions.

In the embodiment, the light source cooling unit comprises the fan 7, the color wheel 8, the motor 15, and the motor input-power controller 16. The motor controller 16 controls the motor 15 according to the brightness data digitized at the extraction circuit 2, to adjust inclination of the wheel's rotational axis by transmitting drive power 17 to the wheel 8. The motor 15 and the motor input-power controller 16 constitute the light source temperature adjustment means.

Figure 6:
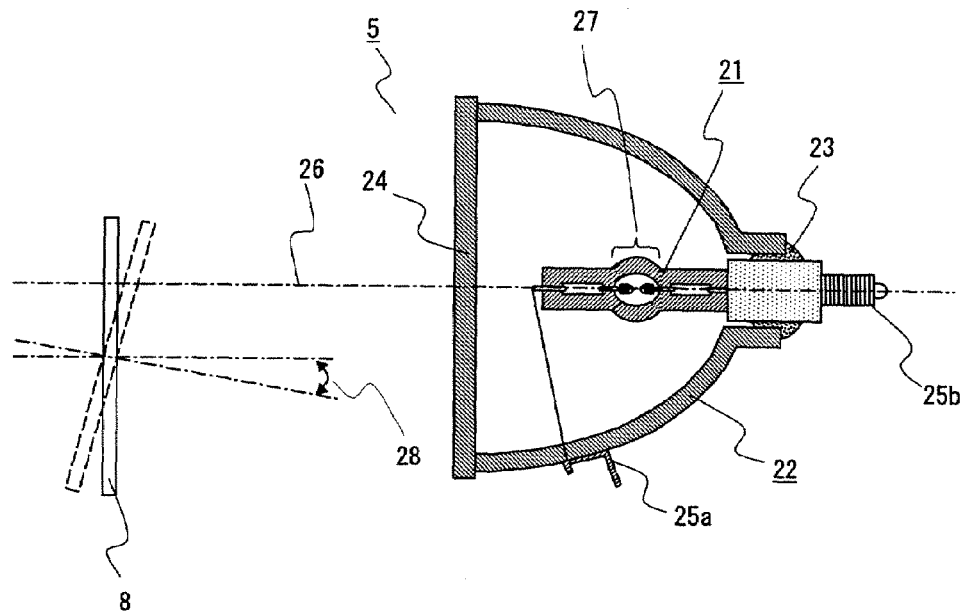
FIG. 6 is a sectional side elevation of an ultrahigh pressure mercury lamp in the second embodiment of the present invention.

FIG. 6 is a sectional side elevation of the lamp 5 and the wheel 8 in the second embodiment of the present invention. Inclination of the wheel's rotational axis using the motor 15 can dynamically change within a range of zero through ten degrees the wheel's inclination with respect to the optical axis 26 of the lamp 5. Light rays emitted from the lamp 5 are reflected from the wheel 8 and returned to the bulb 21, which raises temperature of the bulb 21. This means that changing the wheel's inclination 28 to control the amount of light returning to the bulb 31 causes the temperature of the bulb 21 to be regulated. Namely, the motor 15 and the motor controller 16 control the inclination of the wheel 8 that reflects back to the lamp 5 the light rays emitted therefrom.

Figure 7:
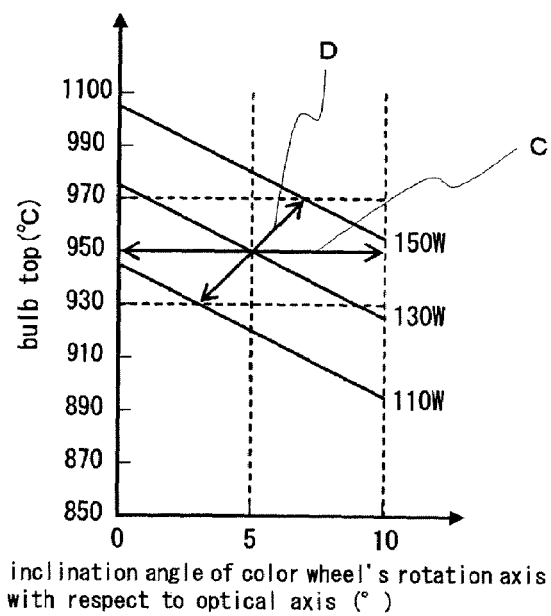
FIG. 7 is a graph illustrating a relationship between an inclination angle of the color wheel's rotational axis with respect to an optical axis corresponding to lamp power and bulb top temperature, in the second embodiment of the present invention.

FIG. 7 is a graph illustrating a relationship between an inclination angle of the rotational axis of the wheel 8 with respect to the axis 26 corresponding to the lamp power and the bulb top temperature. The lamp 5 is the same as that in the first embodiment. A predetermined temperature range in which the bulb temperature is properly maintained is 930 through 970 degrees C. at a rated power of 150 watts. Control by the lamp ignition circuit 4 changes the lamp power from 150 watts down to 110 watts. FIG. 7 shows that even if the lamp power varies, proper selection of an inclination angle of the wheel's rotational axis enables the bulb temperature to remain within the predetermined temperature range. Changing the angle of the wheel's rotational axis as indicated by "C" in FIG. 7 in response to the lamp power variations can maintain the temperature at 950 degrees C.

Furthermore, changing the wheel's angle as indicated by "D" in FIG. 7 in response to the power variations enables the temperature to remain within the range of 930 through 970 degrees C.

Figure 8:
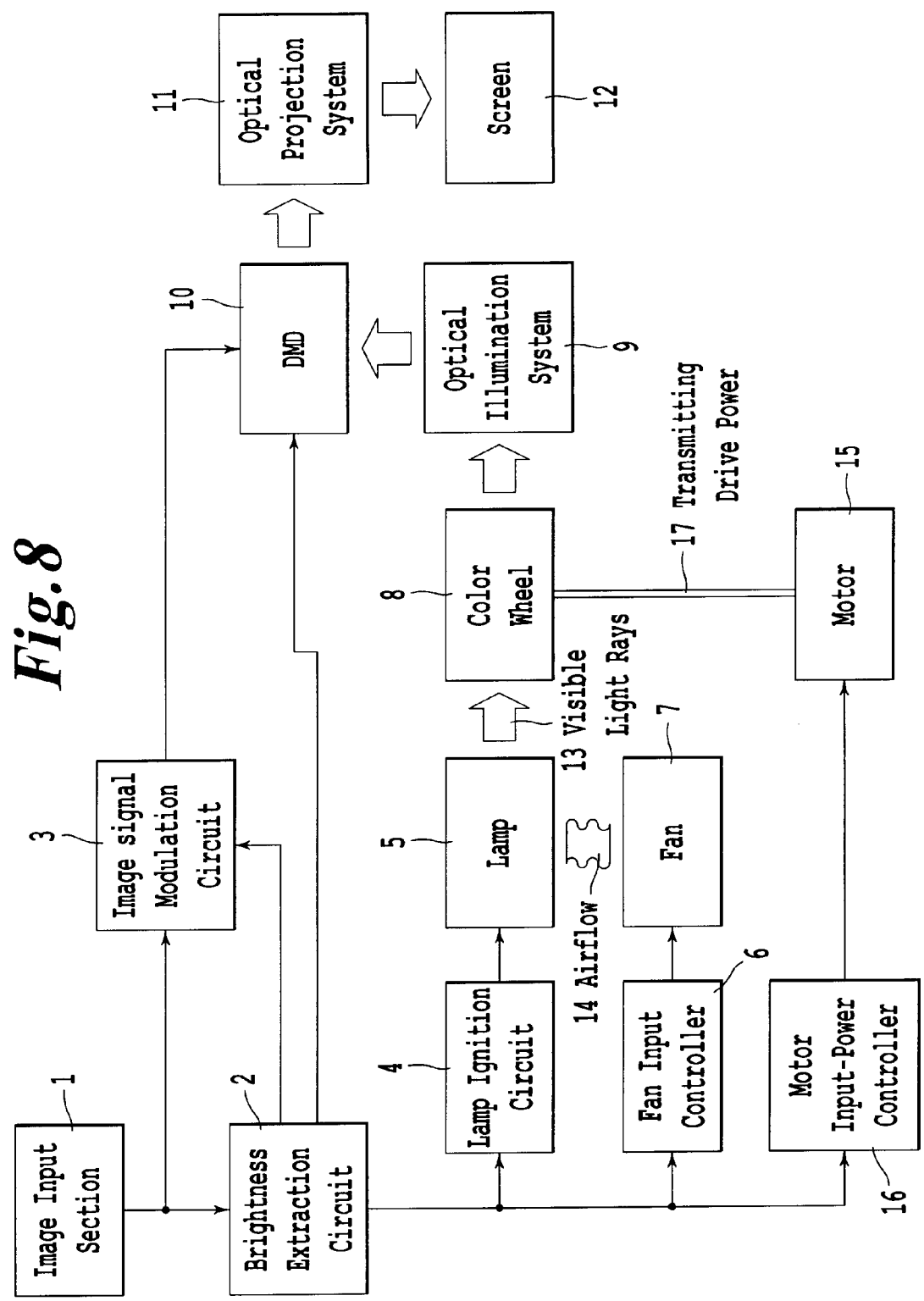
FIG. 8 is another block diagram of a passive optical modulation type display apparatus for explaining the second embodiment of the present invention.

FIG. 8 is another block diagram of a passive optical modulation type display apparatus in a second embodiment for implementing the present invention. Two methods of adjusting the bulb top temperature are combined together: one adjusts the temperature by airflow from the fan 7, and the other, the temperature by controlling the inclination of the wheel 8. Because the fan voltage and the wheel's angle are independently controlled, the temperature can separately be adjusted. For this reason, while the temperature is maintained within the predetermined temperature range, employing two methods together enables the lamp power to vary to a great extent. Thus, the amount of light can be changed extensively, so that the contrast ratio is allowed to be further enhanced.

With the preceedingly described arrangement, in the passive optical modulation type display apparatus using the HID lamp, even when the amount of light entering the DMD 10 is changed by controlling the power fed to the lamp 5, the bulb temperature—the temperature of the lamp 5—can remain within the range in which the halogen cycle can work properly, which thereby provides a passive optical modulation type display apparatus having a higher contrast ratio and a prolonged lamp lifetime.

Figure 9:
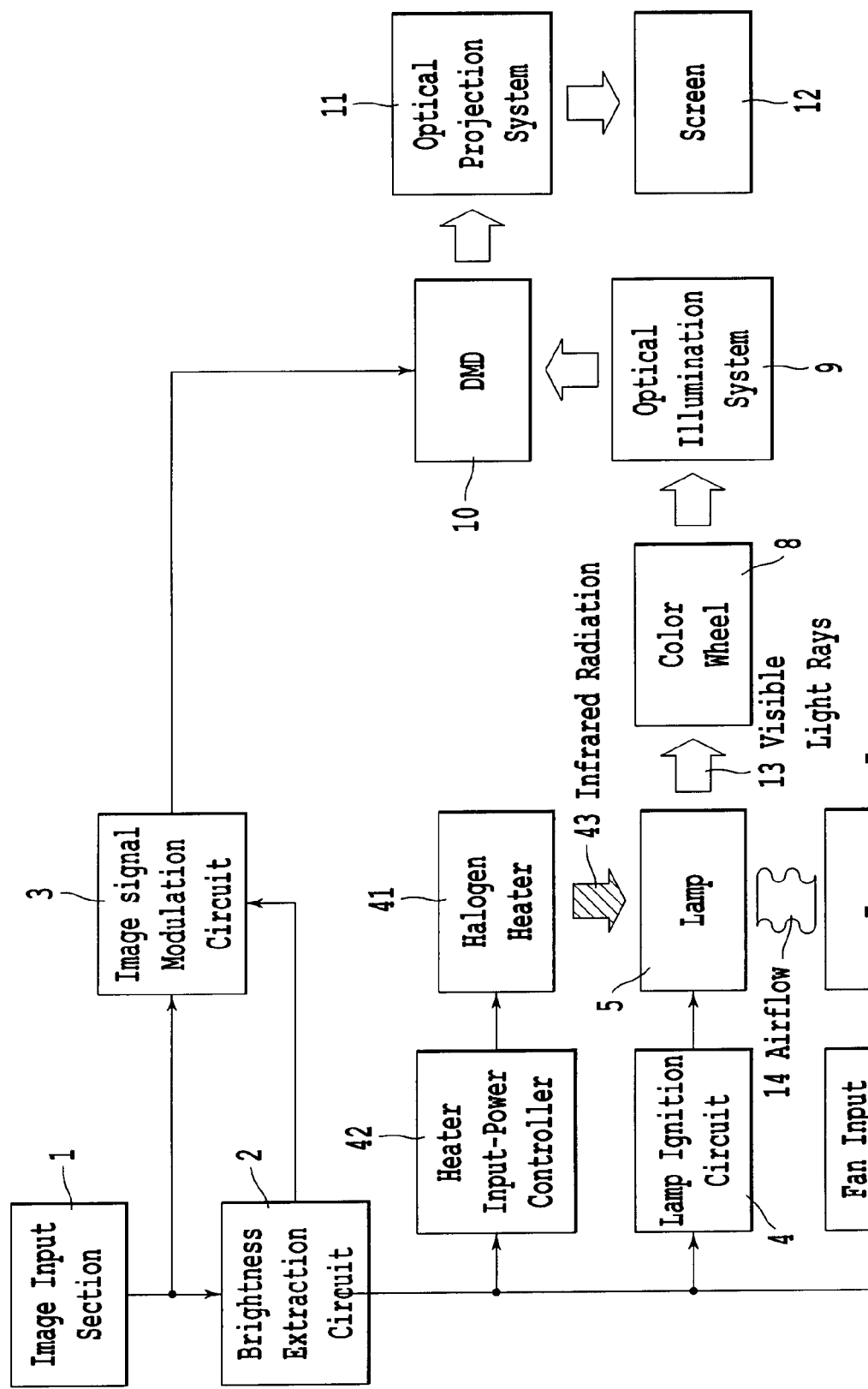
FIG. 9 is a block diagram of a passive optical modulation type display apparatus for explaining a third embodiment of the present invention.

FIG. 9 is a block diagram of a passive optical modulation type display apparatus in a third embodiment for implementing the present invention. Referring to FIG. 9, the third embodiment differs from the first embodiment in that the display apparatus is provided with a halogen heater 41 as a heat source and a heater input-power controller 42. The heater is constituted of the halogen heater 41 and the heater input-power controller 42. When power fed to the lamp 5 is reduced according to the brightness data, the bulb temperature, i.e., the temperature of the lamp 5 may be below a predetermined proper temperature range. Thus, in the embodiment, as another heat source apart from the lamp 5, the halogen heater 41 is provided to heat the lamp 5.

A value determined according to the brightness data digitized at the brightness extraction circuit 2 is inputted into the heater controller 42, adjusting the heating value of the halogen heater 41. Because the heater 41 transmits a heat by means of infrared radiation 43, focusing infrared rays onto the bulb 21 can increase the bulb temperature. Use of the heater 41 eliminates a necessity of placing a structure in the light path inside the reflector 22 of the lamp 5; therefore, the amount of light derived from the lamp 5 via the reflector 5 will not be reduced.

Even if quartz or an electrode of the bulb 21 is heated by using a resistance-heating heater or an induction-heating heater, the same effects as those in heating it using the heater 41 can be obtained. However, since there is a need for the structure to be placed in the light path inside the reflector 22 of the lamp 5, there is reduction in the amount of light derived from the lamp 5 via the reflector 22.

By combining the method of heating the bulb top 27 by the heat source with either of the two previously discussed methods of adjusting the bulb temperature—that is, the method of adjusting the temperature by airflow from the fan 7 and the method of adjusting the temperature by controlling the inclination of the wheel 8—the temperature may be regulated so as to remain within the range in which the halogen cycle can work properly.

With the above described arrangement, even when power supplied to the lamp 5 according to the brightness data is reduced, the heater 41 can heat the bulb 21, which maintain the temperature within the range in which the cycle can work properly; therefore a passive optical modulation type display apparatus having a higher contrast ratio and a prolonged lamp lifetime can be made available.

Figure 10:
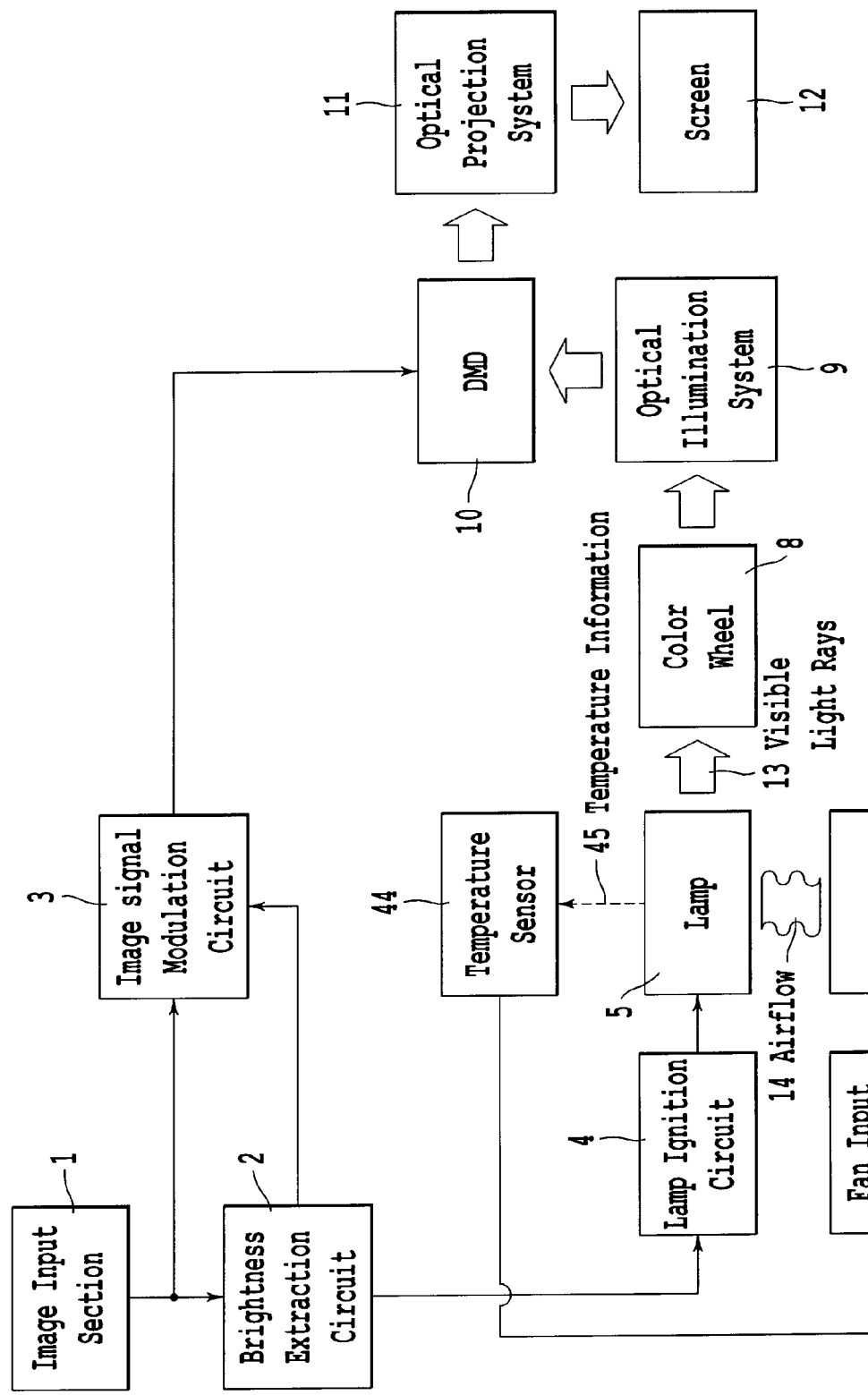
FIG. 10 is a block diagram of a passive optical modulation type display apparatus for explaining a fourth embodiment of the present invention.

FIG. 10 is a block diagram of a passive optical modulation type display apparatus in a fourth embodiment for implementing the present invention. Referring to FIG. 10, the fourth embodiment differs from the first embodiment in that the display apparatus is provided with a temperature sensor 44—temperature extraction means. In the first embodiment through the third embodiment, when the lamp power is controlled according to the brightness data digitized at the extraction circuit 2, cooling and heating the bulb top 27 are controlled, i.e., an open loop control is performed. Thus, whether or not the bulb temperature in effect remains within the proper temperature range is not accurately determined. In the embodiment, consequently, the bulb temperature is regulated by measuring it to ensure that it remains within the temperature range.

Referring to FIG. 10, the temperature sensor 44 for measuring the bulb temperature is provided to directly feed back to the cooling unit and heating unit (not shown) temperature information 45 on the bulb top 27, . Thus, the fan 7, which is a light source temperature adjustment means, adjusts the bulb temperature, which is the temperature of the lamp 5, so that that the temperature remains within the predetermined temperature range according to the temperature information 45 obtained by the sensor 44. When controlling the lamp power, the bulb top 27 is cooled and heated according to the temperature information 45 obtained by the sensor 44, i.e., a closed loop control is performed.

Using a non-contact radiation thermometer as the sensor 44 eliminates a necessity of placing a structure in the light path inside the reflector 22; therefore, there is no reduction in the amount of light derived from the lamp 5 via the reflector 22. Moreover, the sensor 44 may measure temperatures at other portions of the lamp 5 such as its electrode terminals 19a and 19b, and the outside of the reflector 22 from which the bulb temperature can be estimated. When compared with direct measurement of the bulb top, the closed loop control provides less accuracy in temperature extraction; however, it achieves accurate temperature adjustment. The sensor 44 may employ a chromel-alumel thermocouple. Disposing a structure in the light path inside the reflector 22 of the lamp 5, however, reduces the amount of light derived from the lamp 5 via the reflector 22.

It should be noted that according to the temperature information obtained by the sensor 44, the bulb temperature may be regulated so as to remain within the range in which the halogen cycle can work properly, by combining the method of: heating the bulb top 27 by the heat source, with that of cooling the bulb top by airflow from the fan 7 and by controlling the inclination of the wheel 8.

According to the temperature information 45 obtained by the temperature sensor, the above-described arrangement cools and heats the bulb top 27, which can maintain the temperature within the range in which the cycle can work properly; therefore the passive optical modulation type display apparatus having a higher contrast ratio and a prolonged lamp lifetime can be made available.

Figure 11:
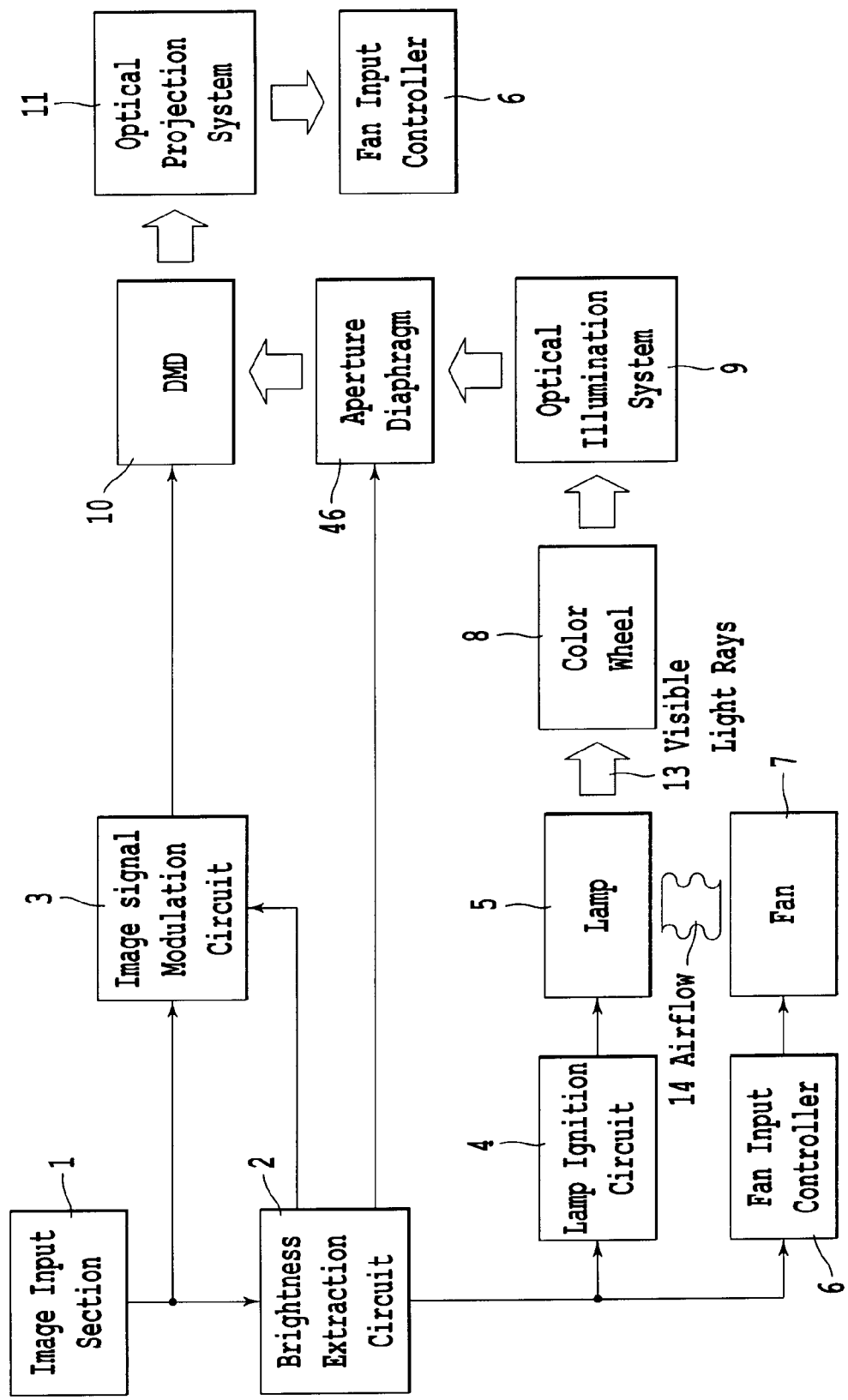
FIG. 11 is a block diagram of a passive optical modulation type display apparatus for explaining a fifth embodiment of the present invention.

FIG. 11 is a block diagram of a passive optical modulation type display apparatus in a fifth embodiment for implementing the present invention. Referring to FIG. 11, the fifth embodiment differs from the first embodiment in that the display apparatus is provided with an iris diaphragm 46—aperture diaphragm means. When the control of the lamp power adjusts the amount of light, the lamp lifetime is reduced, which therefore does not permits the lamp power to be extensively changed. Furthermore, excessive reduction of the lamp power may in some cases leads to inability of continuous discharging. Therefore, it is effective that use of the aperture diaphragm means extendedly changes the amount of light.

In addition to the method of adjusting the amount of light emitted from the lamp 5 itself in order to adjust the amount of light that enters the DMD 10, there is a method of disposing the diaphragm means between the lamp 5 and the DMD 10. The diaphragm means includes a means for mechanically changing the aperture size thereof as in the aperture diaphragm 46, a means for using a device that electrically changes light-transmission volume as is the case with liquid crystal, and a means for changing the amount of light transmission by mechanically replacing with each other neutral density filters having mutually different transmittance. The diaphragm means is capable of adjusting the amount of light transmission from 0% to 100%, having an extensive light adjustment range.

The embodiment incorporates the aperture diaphragm 46 as the diaphragm means, which provides extensive amount-of-light adjustment independently of control operation of the lamp 5, thus achieving high image contrast without reducing the lamp lifetime. The aperture diaphragm 46 is an amount-of-light control means that is disposed between the lamp 5 as the light source and the DMD 10 as the light modulation device, and adjusts the amount of light by changing the transmission amount of light emitted from the lamp 5. In contrast, reduction of the amount of light by using the diaphragm means leads to luminous efficiency being lowered because only the light rays that pass through the diaphragm means are used for imaging. Furthermore, the apparatus temperature rises because light rays that do not pass through the diaphragm means turn into heat in the apparatus.

Figure 12:
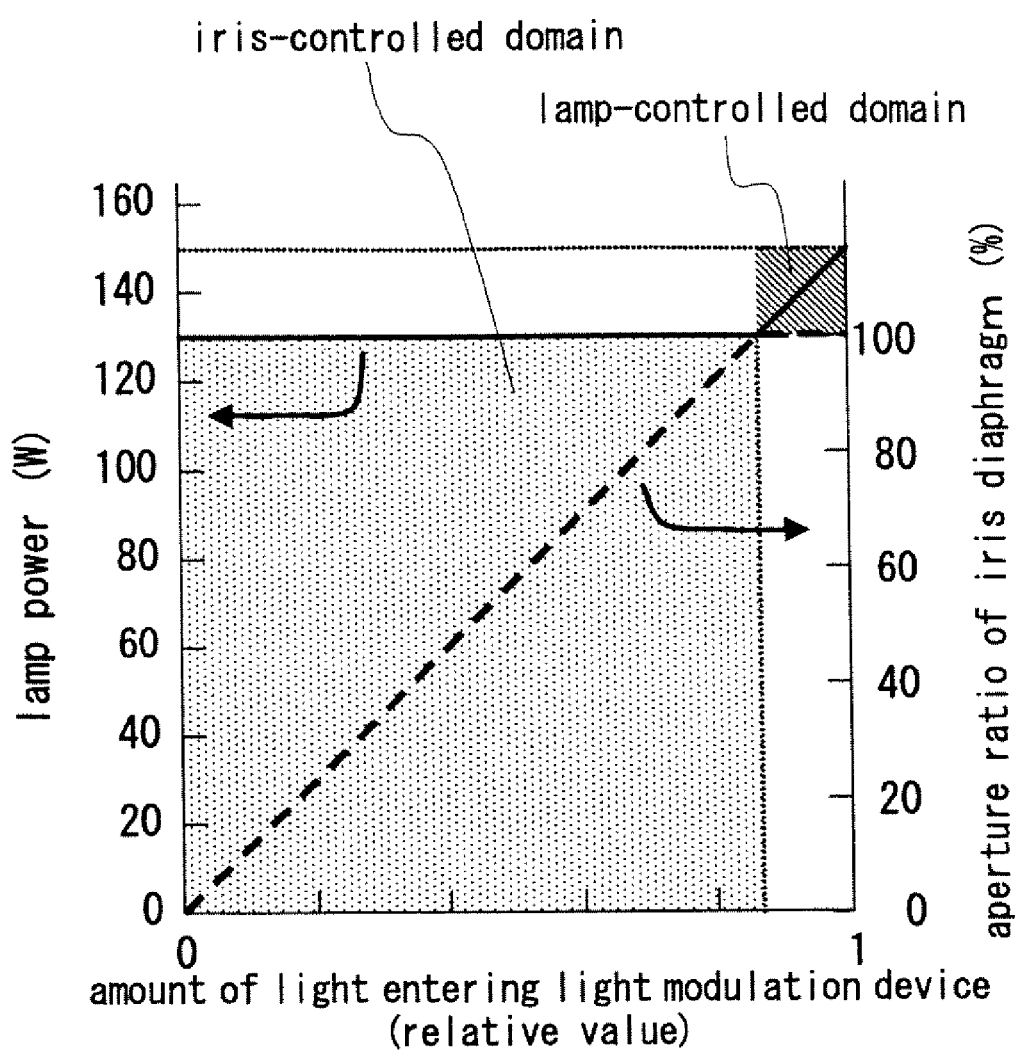
FIG. 12 is a graph illustrating a relationship between the amount of light entering a light modulation device and lamp power, and a relationship between the amount of light and an aperture ratio of an iris diaphragm, in the fifth embodiment of the present invention.

FIG. 12 is a graph illustrating a relationship between the amount of light entering the light modulation device and the lamp power, and a relationship between the amount of light and an aperture ratio of the iris aperture diaphragm, in a fifth embodiment of the present invention. In order to achieve high contrast by extensively adjusting the amount of light, the diaphragm means such as the aperture diaphragm 46 is utilized. In order to increase the luminous efficiency of the display apparatus by reducing the lamp power, the amount of light emitted from the lamp 5 itself is adjusted. Consequently, combining those methods achieves a high contrast ratio and high luminous efficiency. Referring to FIG. 12, the horizontal axis of the graph shows a relative value of the amount of light entering the light modulation device; the left vertical axis, the lamp power; the right vertical axis, an aperture ratio of the aperture diaphragm 46. The solid line shows changes of the amount of light being dependent of the lamp power, and the dotted line, those being dependent of the aperture ratio of the aperture diaphragm 46. The amount of light can be adjusted in substantially proportional to the lamp power, or the aperture ratio of the aperture diaphragm 46. The lamp power and the aperture ratio of the aperture diaphragm 46 can independently be controlled.

As shown in FIG. 12, when a large amount of light is made enter the light modulation device, the lamp power control operation adjusts the amount of light. For example, adjusting the lamp power in the range of 130 watts through 150 watts can change the amount of light in the range of 0.87 through 1, which can achieve high image contrast. By controlling in response to the brightness data the lamp power in the range of 130 watts through 150 watts, and cooling the bulb top 27 by means of the airflow 14, the bulb top temperature can be maintained within the temperature range in which the halogen cycle can work properly. Adjusting the amount of light to a value of 0.87 or less can be achieved by controlling the aperture ratio of the aperture diaphragm 46, which can cause the amount of light to vary within a range of zero through 0.87 when the lamp power is set to 130 watts. This arrangement allows the contrast ratio to be greatly enhanced. Referring back to FIG. 12, as shown on the straight line made by connecting two lines together—the solid line drawn in a lamp-power-controlled domain, and the dotted line drawn in an iris-aperture-controlled domain—the amount of light can extensively be changed.

Since the amount of light is adjusted as discussed above, by combining the method of controlling the power so that that the temperature remains within the range in which the cycle can work properly, and the method of controlling the amount of light transmission by the aperture diaphragm 46, a passive optical modulation type display apparatus having a high contrast ratio and a prolonged lamp lifetime can be provided.

Figure 13:
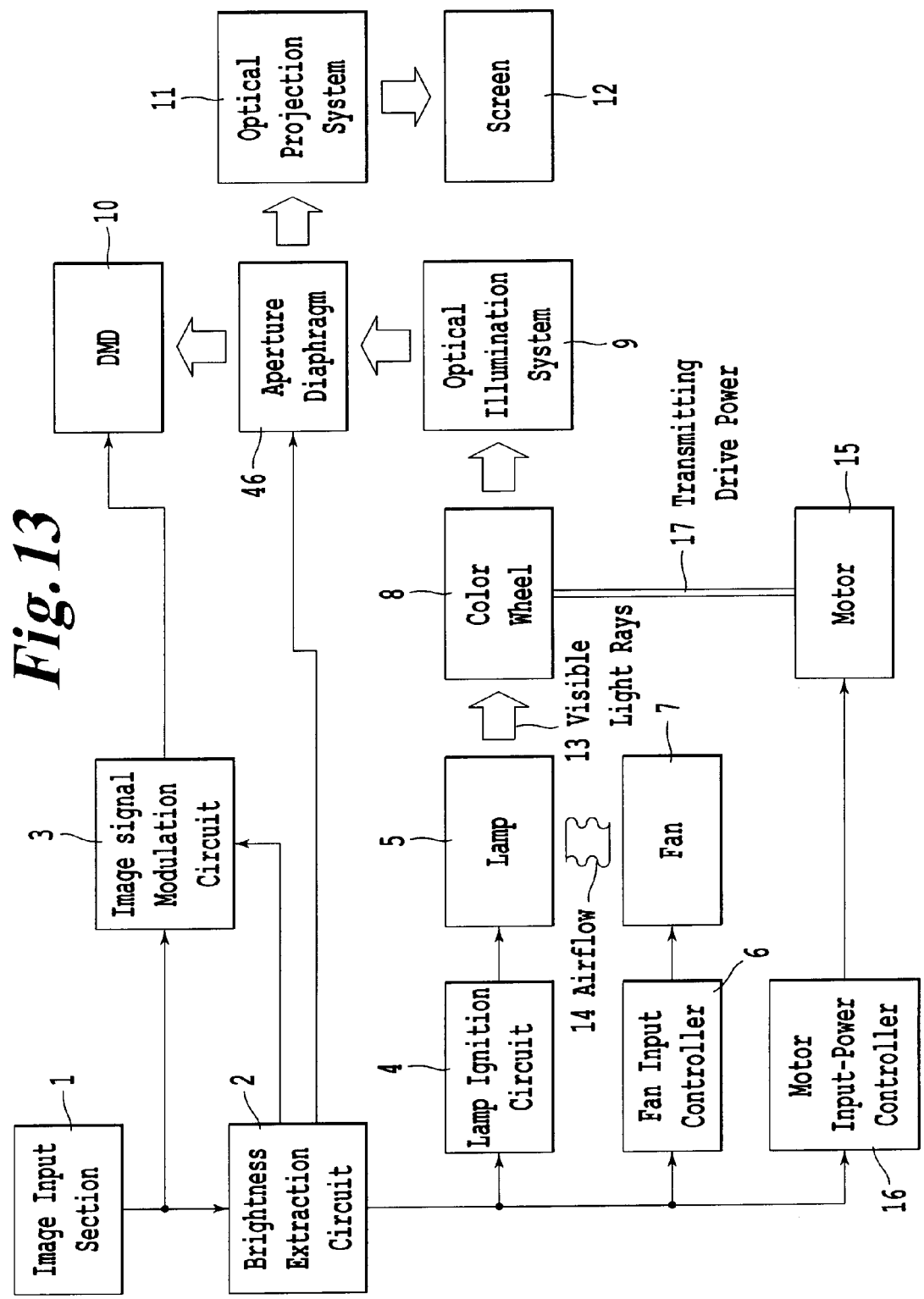
FIG. 13 is a block diagram of a passive optical modulation type display apparatus for explaining a sixth embodiment of the present invention.

FIG. 13 is a block diagram of a passive optical modulation type display apparatus in a sixth embodiment for implementing the present invention. Referring to FIG. 13, the sixth embodiment differs from the fifth embodiment in that the light source cooling unit is provided with a motor 15 and a motor input-power controller 16. The controller 16 controls the motor 15 according to the brightness data digitized at the extraction circuit 2, to control inclination of the rotational axis of the wheel 8.

As is the case with the fifth embodiment, when a large amount of light enter the light modulation device, the lamp power control operation adjusts the amount of light. For example, adjusting the lamp power in the range of 130 watts through 150 watts can change the amount of light in the range 0.87 through 1, which can achieve high image contrast. When, in response to the brightness data, the lamp power is controlled in the range of 130 watts through 150 watts, the temperature can be maintained within the range in which the cycle can work properly, by controlling the inclination of the wheel 8 to cool the bulb top 27 in addition to cooling it by means of the airflow 14. Adjusting the amount of light to a value of 0.87 or less can be achieved by controlling the aperture ratio of the aperture diaphragm 46, which can cause the amount of light to vary within the range of 0 through 0.87. This permits the contrast ratio to be substantially improved. It should be noted that when the lamp power is controlled, in response to the brightness data, only by controlling the inclination of the wheel 8, the bulb top 27 may be cooled.

Because the amount of light is adjusted as described above, by combining the method of controlling power so that that the temperature remains within the range in which the cycle can work properly, and the method of controlling light transmission by the aperture diaphragm 46, a passive optical modulation type display apparatus having a prolonged lamp lifetime can be provided.

Figure 14:
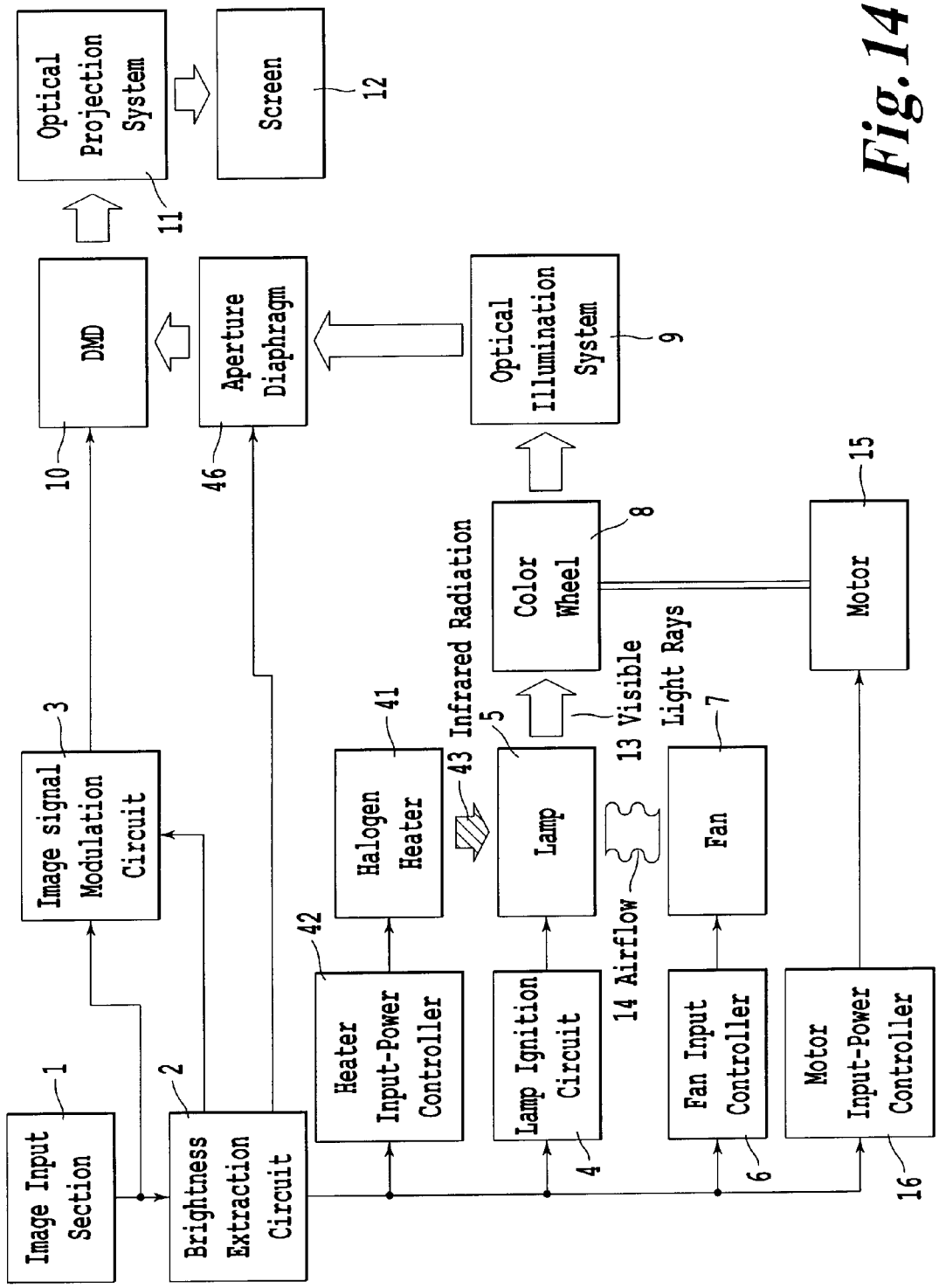
FIG. 14 is a system block diagram of a passive optical modulation type display apparatus for explaining a seventh embodiment of the present invention.

FIG. 14 is a system block diagram of a passive optical modulation type display apparatus in a seventh embodiment for implementing the present invention. Referring to FIG. 14, the seventh embodiment differs from the sixth embodiment in that the display apparatus is provided with the halogen heater 41 as the heat source and the heater input-power controller 42. When power supplied to the lamp 5 is reduced in response to the brightness data, the bulb top temperature may be below a predetermined proper temperature range. Thus, in the embodiment, as another heat source separate from the lamp 5, the halogen heater 41 is provided to heat the lamp 5.

As is the case with the fifth embodiment, when a large amount of light rays enter the light modulation device, the amount of light is adjusted by controlling the lamp power. For example, adjusting the lamp power in the range of 130 watts through 150 watts can change the amount of light in the range of 0.87 through 1, thus achieving high image contrast. When the lamp power is controlled in response to the brightness data, in the range of 130 watts through 150 watts, a method of heating the bulb top 27 with the heater 41 (heat source) can be used in addition to the methods of cooling the bulb top 27 by means of the airflow 14 and by controlling the inclination of the wheel 8. Thus, a method in which those three are combined together can maintain the temperature within the range in which the halogen cycle can work properly. Adjusting the amount of light to a value of 0.87 or less can be achieved by controlling the aperture ratio of the aperture diaphragm 46, which can cause the amount of light to vary within the range of zero through 0.87. This arrangement permits the contrast ratio to be improved to a great degree.

It should be noted that when controlling in response to the brightness data the lamp power, the temperature may be regulated so as to remain within the range in which the cycle can work properly, by combining two methods of heating the bulb top 27 using the halogen heater 41 and of cooling the bulb top 27 by the airflow or by controlling the inclination of the wheel 8.

Because the amount of light is adjusted as discussed above, by combining the method of controlling the power so that that the temperature remains within the range in which the cycle can work properly, with the method of controlling the amount of light transmission by the aperture diaphragm 46, a passive optical modulation type display apparatus having a high contrast ratio and a prolonged lamp lifetime can be provided. It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

What is claimed is:

1. A display apparatus comprising:
   an image-data input means for receiving, as input, image data derived from an image signal provided to the display apparatus for display thereby;
   a brightness extraction means for receiving image data from said image-data input means, digitizing brightness data derived from the image data, and outputting the digitized brightness data;
   a light source;
   a light source-temperature adjusting means for regulating in accordance with the digitized brightness data the temperature of said light source so as to remain within a predetermined temperature range;
   a light modulation device disposed to receive light emitted from said light source, and configured to modulate the received light in accordance with the image data to display the image signal; and
   a light source controlling means for receiving the digitized brightness data from said brightness extraction means, and controlling in accordance with the digitized brightness data electric power inputted to said light source, to adjust the amount of light that enters said light modulation device.

2. A display apparatus comprising:
   an image-data input means for receiving, as input, image data derived from an image signal provided to the display apparatus for display thereby;
   a brightness extraction means for receiving image data from said image-data input means, digitizing brightness data derived from the image data, and outputting the digitized brightness data;
   a light source;
   a temperature detection means for sensing the temperature of said light source;
   a light source-temperature adjusting means for regulating, in response to said temperature detection means, the temperature of said light source so as to remain within a predetermined temperature range;
   a light modulation device disposed to receive light emitted from said light source, and configured to modulate the received light in accordance with the image data to display the image signal; and
   a light source controlling means for receiving the digitized brightness data from said brightness extraction means, and controlling in accordance with the digitized brightness data electric power inputted to said light source, to adjust the amount of light that enters said light modulation device.

3. The display apparatus according to either claim 1 or 2, further comprising an amount-of-light control means, disposed between said light source and said light modulation device, for varying the amount of light source light that the control means passes and to adjust the amount of light that enters said light modulation device.

4. The display apparatus according to claims 1 or 2, further comprising a fan disposed to cool said light source, wherein said light source-temperature adjusting means adjusts the fan's airflow volume.

5. The display apparatus according to claims 1 or 2, further comprising a color wheel, disposed between said light source and said light modulation device to reflect the light source-emitted light back to said light source, wherein said light source-temperature adjusting means adjusts inclination of said color wheel.

6. The display apparatus according to claims 1 or 2, wherein said light source-temperature adjusting means comprises a heat source for heating said light source.

7. The display apparatus according to claims 1 or 2, wherein said light source comprises a high-intensity discharge lamp.

8. A display apparatus comprising:
   an image-data input unit configured to receive, as input, image data derived from an image signal provided to the display apparatus for display thereby;
   a brightness extraction unit configured to receive image data from said image-data input unit, digitizing brightness data derived from the image data, and outputting the digitized brightness data;
   a light source;
   a light source-temperature adjusting unit configured to regulate in accordance with the digitized brightness data the temperature of said light source so as to remain within a predetermined temperature range;
   a light modulation device disposed to receive light emitted from said light source, and configured to modulate the received light in accordance with the image data to display the image signal; and
   a light source controlling unit configured to receive the digitized brightness data from said brightness extraction unit, and controlling in accordance with the digitized brightness data electric power inputted to said light source, to adjust the amount of light that enters said light modulation device.

9. A display apparatus comprising:
   an image-data input unit configured to receive, as input, image data derived from an image signal provided to the display apparatus for display thereby;
   a brightness extraction unit configured to receive image data from said image-data input unit, digitizing brightness data derived from the image data, and outputting the digitized brightness data;
   a light source;
   a temperature detection unit configured to sense the temperature of said light source;
   a light source-temperature adjusting unit configured to regulate, in response to said temperature detection unit, the temperature of said light source so as to remain within a predetermined temperature range;
   a light modulation device disposed to receive light emitted from said light source, and configured to modulate the received light in accordance with the image data to display the image signal; and a light source controlling unit configured to receive the digitized brightness data from said brightness extraction unit, and controlling in accordance with the digitized brightness data electric power inputted to said light source, to adjust the amount of light that enters said light modulation device.

10. The display apparatus according to either claim 8 or 9, further comprising an amount-of-light control unit, disposed between said light source and said light modulation device, configured to vary the amount of light source light that the control unit passes and to adjust the amount of light that enters said light modulation device.

11. The display apparatus according to claim 8 or 9, further comprising a fan disposed to cool said light source, wherein said light source-temperature adjusting unit is configured to adjust the fan's airflow volume.

12. The display apparatus according to claim 8 or 9, further comprising a color wheel, disposed between said light source and said light modulation device and configured to reflect the light source-emitted light back to said light source, wherein said light source-temperature adjusting unit is configured to adjust inclination of said color wheel.

13. The display apparatus according to claim 8 or 9, wherein said light source-temperature adjusting unit comprises a heat source configured to heat said light source.

14. The display apparatus according to claim 8 or 9, wherein said light source comprises a high-intensity discharge lamp.

* * * * *